United States Patent
Curtice (10) Patent No.: US 8,991,495 B2
(45) Date of Patent: Mar. 31, 2015

(54) METHODS FOR PROTECTING A HYDROCARBON-PRODUCING ZONE OF A SUBTERRANEAN FORMATION USING A RELATIVE PERMEABILITY MODIFIER

(75) Inventor: Richard James Curtice, Vernal, UT (US)

(73) Assignee: Halliburton Energy Services, Inc., Houston, TX (US)

( * ) Notice: Subject to any disclaimer, the term of this patent is extended or adjusted under 35 U.S.C. 154(b) by 421 days.

(21) Appl. No.: 13/475,385

(22) Filed: May 18, 2012

(65) Prior Publication Data
US 2013/0306314 A1 Nov. 21, 2013

(51) Int. Cl.
| | | |
|---|---|---|
| *E21B 33/138* | (2006.01) | |
| *C09K 8/506* | (2006.01) | |
| *C04B 28/02* | (2006.01) | |
| *E21B 43/14* | (2006.01) | |
| *E21B 43/16* | (2006.01) | |
| *C09K 8/035* | (2006.01) | |

(52) U.S. Cl.
CPC ............... *C09K 8/506* (2013.01); *C04B 28/02* (2013.01); *E21B 43/14* (2013.01); *E21B 43/16* (2013.01); *C09K 8/035* (2013.01); *E21B 33/138* (2013.01)
USPC .......................... 166/292; 166/300; 166/305.1

(58) Field of Classification Search
CPC ...... C04B 28/02; C09K 8/508; E21B 33/138; E21B 43/16
See application file for complete search history.

(56) References Cited

U.S. PATENT DOCUMENTS

| | | | |
|---|---|---|---|
| 4,466,831 | A | 8/1984 | Murphey |
| 5,002,127 | A | 3/1991 | Dalrymple et al. |
| 5,249,627 | A | 10/1993 | Harms et al. |
| 5,836,392 | A | 11/1998 | Urlwin-Smith |
| 6,176,315 | B1 | 1/2001 | Reddy et al. |
| 6,192,986 | B1 | 2/2001 | Urlwin-Smith |
| 6,196,317 | B1 | 3/2001 | Hardy |
| 6,476,169 | B1 | 11/2002 | Eoff et al. |
| 7,114,568 | B2 | 10/2006 | Eoff et al. |
| 7,131,491 | B2 | 11/2006 | Blauch et al. |
| 7,759,292 | B2 | 7/2010 | Eoff et al. |
| 2013/0292118 | A1 | 11/2013 | Nguyen |

FOREIGN PATENT DOCUMENTS

| | | |
|---|---|---|
| WO | 2013166128 A1 | 11/2013 |
| WO | 2013173600 A2 | 11/2013 |

OTHER PUBLICATIONS

International Search Report and Written Opinion for PCT/US2013/041384 dated May 28, 2014.

*Primary Examiner* — Zakiya W Bates
(74) *Attorney, Agent, or Firm* — McDermott Will & Emery LLP; Holly Soehnge (57) ABSTRACT

A relative permeability modifier may be used to protect a hydrocarbon-producing zone of a subterranean formation without detrimentally affecting its ability to produce hydrocarbons. Methods for protecting a hydrocarbon-producing zone of a subterranean formation can comprise: introducing a first treatment fluid comprising a relative permeability modifier to a hydrocarbon-producing zone of a subterranean formation also comprising a water-producing zone; concurrently with or after introducing the first treatment fluid to the hydrocarbon-producing zone, introducing a second treatment fluid comprising a sealant composition to the water-producing zone; and allowing the relative permeability modifier to substantially prevent the sealant composition from entering the hydrocarbon-producing zone.

21 Claims, 4 Drawing Sheets

METHODS FOR PROTECTING A HYDROCARBON-PRODUCING ZONE OF A SUBTERRANEAN FORMATION USING A RELATIVE PERMEABILITY MODIFIER

BACKGROUND

The present invention generally relates to the production of hydrocarbon fluids from a subterranean formation, and, more specifically, to the use of relative permeability modifiers in conjunction with the production of hydrocarbon fluids.

Water can often undesirably accompany the production of hydrocarbons from a well penetrating a subterranean formation. In a subterranean formation, water's high mobility can often allow it to flow to or from a wellbore by way of natural and manmade fractures, highly permeable zones, and the like. The unwanted production of water from a hydrocarbon-producing well can constitute a considerable technical problem and expense in oilfield operations. If the ratio of produced water to produced hydrocarbons becomes sufficiently large, the cost of separating the water and disposing and/or treating it can become a significant issue. For example, in some instances, poor well economics arising from excess water production can lead to abandonment of a wellbore, even when significant amounts of hydrocarbons remain within a subterranean formation penetrated by the wellbore.

One way in which the production of water from water-producing subterranean zones has been addressed is through the use of relative permeability modifiers (RPMs). RPMs may reduce the production of water from a subterranean zone without substantially reducing the production of hydrocarbons therefrom. Thus, RPMs may slow the production of water from the subterranean formation and make a well more economically feasible to produce. An advantage of RPMs over other techniques for reducing water flow in a subterranean formation is that RPMs usually do not necessitate the use of zonal isolation techniques to successfully place the treatment in a desired location, since reduced hydrocarbon production is generally not a concern with their use.

Although RPMs may slow the production of water from a subterranean formation, water production may sometimes still be unacceptably high after treatment. In these instances and others, instead of an RPM, a sealant composition may be introduced to a water-producing zone to at least partially block the flow of fluids therefrom. Unlike RPMs, which only significantly impede the production of water, sealant compositions may impede the production of all fluid types by forming an impermeable fluid seal. Sealant compositions may comprise, for example, water-soluble, gellable polymers that can enter a water-producing subterranean zone, where they subsequently gel to form a fluid seal that impedes fluid flow. Other sealant compositions are known and may function in a similar or related manner. In contrast to RPMs, zonal isolation techniques may sometimes be needed when using a sealant composition to prevent its incursion into a hydrocarbon-producing subterranean zone, where it may produce damage that reduces hydrocarbon production.

Although zonal isolation techniques may oftentimes be sufficient to place a sealant composition in a desired location (e.g., a water-producing subterranean zone), in some instances a sealant composition may still enter an undesired location (e.g., a hydrocarbon-producing subterranean zone). Reasons why a sealant composition might undesirably enter a hydrocarbon-producing zone may include, for example, failed zonal isolation strategies or fluid conduits (e.g., natural or manmade fractures, or like means of fluid communication) extending between the hydrocarbon-producing zone and the water-producing zone that are not easily addressed by zonal isolation techniques. Migration of a sealant composition from a water-producing zone to a hydrocarbon-producing zone may be especially problematic when the hydrocarbon-producing zone and the water-producing zone are located close to one another in the subterranean formation. In some instances, there may be no natural subterranean barrier existing between the hydrocarbon-producing zone and the water-producing zone to prevent fluid exchange therebetween. In such cases, a sealant composition, even if properly diverted to a water-producing zone, may undesirably impact production from the hydrocarbon-producing zone. In such cases, remediation operations may sometimes be needed to return the wellbore to production. In more extreme cases, if the hydrocarbon-producing zone cannot be remediated, the wellbore may have to be abandoned.

One way in which a sealant composition may be at least partially prevented from entering a hydrocarbon-producing zone from a neighboring water-producing zone is to introduce the sealant composition at low pump rates so as not to promote an overpressure that forces the sealant composition into the hydrocarbon-producing zone. Another way this problem can be solved is to introduce a non-damaging fluid into the hydrocarbon-producing zone at the same time as a sealant composition is being introduced to the water-producing zone. The non-damaging fluid may exert sufficient outward pressure within the hydrocarbon-producing zone to at least partially prevent the inward incursion of the sealant composition from the water-producing zone. Either of these treatment protocols may significantly increase the complexity and cost of hydrocarbon production, and they may oftentimes only provide a limited degree of success in preventing incursion of a sealant composition into the hydrocarbon-producing subterranean zone.

SUMMARY OF THE INVENTION

The present invention generally relates to the production of hydrocarbon fluids from a subterranean formation, and, more specifically, to the use of relative permeability modifiers in conjunction with the production of hydrocarbon fluids.

In some embodiments, the present invention provides a method comprising: introducing a first treatment fluid comprising a relative permeability modifier to a hydrocarbon-producing zone of a subterranean formation also comprising a water-producing zone; concurrently with or after introducing the first treatment fluid to the hydrocarbon-producing zone, introducing a second treatment fluid comprising a sealant composition to the water-producing zone; and allowing the relative permeability modifier to substantially prevent the sealant composition from entering the hydrocarbon-producing zone.

In some embodiments, the present invention provides a method comprising: providing a subterranean formation penetrated by a wellbore comprising a work string and an annulus disposed about the work string, the subterranean formation comprising a hydrocarbon-producing zone and a water-producing zone, the water-producing zone being located below the hydrocarbon-producing zone; introducing a first treatment fluid comprising a relative permeability modifier to the hydrocarbon-producing zone, the first treatment fluid being introduced via the annulus; concurrently with or after introducing the first treatment fluid to the hydrocarbon producing zone, introducing a second treatment fluid comprising a sealant composition to the water-producing zone, the second treatment fluid being introduced via the work string; and producing a hydrocarbon fluid from the subterranean formation.

In some embodiments, the present invention provides a method comprising: providing a subterranean formation penetrated by a wellbore comprising a work string and an annulus disposed about the work string, the subterranean formation comprising a hydrocarbon-producing zone and a water-producing zone, the water-producing zone being located above the hydrocarbon-producing zone; introducing a first treatment fluid comprising a relative permeability modifier to the hydrocarbon-producing zone, the first treatment fluid being introduced via the work string; concurrently with or after introducing the first treatment fluid to the hydrocarbon producing zone, introducing a second treatment fluid comprising a sealant composition to the water-producing zone, the second treatment fluid being introduced via the annulus; and producing a hydrocarbon fluid from the subterranean formation.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present invention generally relates to the production of hydrocarbon fluids from a subterranean formation, and, more specifically, to the use of relative permeability modifiers in conjunction with the production of hydrocarbon fluids.

In order to address many of the issues discussed above, methods are presented herein through which a hydrocarbon-producing zone of a subterranean formation may be protected while sealing a water-producing zone with a sealant composition, without substantially impacting the hydrocarbon-producing zone's ability to produce hydrocarbons. Specifically, the present methods involve treatment protocols whereby a hydrocarbon-producing zone of a subterranean formation may be treated with a relative permeability modifier before or concurrently with the introduction of a sealant composition to a water-producing zone. These treatment protocols may provide many potential advantages for hydrocarbon production, some of which are discussed in further detail hereinafter.

As used herein, a "treatment fluid" is a fluid that is placed in a subterranean formation in order to perform a desired function. Treatment fluids can be used in a variety of subterranean operations, including, but not limited to, drilling operations, production treatments, stimulation treatments, remedial treatments, fluid diversion operations, fracturing operations, secondary or tertiary enhanced oil recovery (EOR) operations, and the like. As used herein, the terms "treat," "treatment," "treating," and other grammatical equivalents thereof refer to any subterranean operation that uses a fluid in conjunction with performing a desired function and/or achieving a desired purpose. The terms "treat," "treatment," and "treating," as used herein, do not imply any particular action by the fluid or any particular component thereof unless otherwise specified. Treatment fluids can include, for example, drilling fluids, fracturing fluids, acidizing fluids, conformance treatment fluids, damage control fluids, remediation fluids, scale removal and inhibition fluids, chemical floods, and the like.

It is believed that the treatment methods described herein represent uses for relative permeability modifiers that have not been heretofore considered. Conventional uses of relative permeability modifiers may involve their introduction to a subterranean zone or zones producing both hydrocarbons and water, so as to reduce the production of water without significantly impacting the production of hydrocarbons. Typically, there is no need to expressly exclude a relative permeability modifier from a water-producing zone, since the usual intent of a relative permeability modifier treatment is to reduce water production. In the methods described herein, a contrary approach is taken, with a relative permeability modifier being introduced preferentially to a hydrocarbon-producing zone and excluded from a water-producing zone. In fact, in the present methods, it may actually be undesirable to introduce a relative permeability modifier to a water-producing zone, since such introduction may limit one's ability to shut off water production using a sealant composition, as discussed hereinafter.

According to embodiments of the present invention, a treatment fluid comprising a relative permeability modifier may be introduced to a hydrocarbon-producing zone of a subterranean formation before or concurrently with the introduction of a treatment fluid comprising a sealant composition to a water-producing zone. These types of treatment protocols may protect the hydrocarbon-producing zone from incursion by the sealant composition. When introduced to the hydrocarbon-producing zone in this manner, the relative permeability modifier may permeate throughout the hydrocarbon-producing zone and reduce its effective water permeability, even though little or no water may be natively present in the zone in some cases. However, the relative permeability modifier in the hydrocarbon-producing zone may also reduce the likelihood of water incursion or incursion of a substance carried by water from neighboring subterranean zones, specifically a water-producing subterranean zone. In particular, reducing the permeability of the hydrocarbon-producing zone to aqueous fluids may limit the incursion of a sealant composition, particularly an aqueous-based sealant, from the water-producing zone.

Use of a relative permeability modifier to limit incursion of a sealant composition into a hydrocarbon-producing zone may be advantageous from the standpoint of not having to exercise rigorous controls on pump rates in order to maintain a pressure differential between two zones. Instead of creating a transient pressure barrier, a relative permeability modifier simply reduces the transport of a sealant composition to the hydrocarbon-producing zone via an aqueous fluid, thereby providing protection thereto. Thus, the methods described herein are operationally simple and may allow hydrocarbon fluids to be produced from a subterranean formation more quickly and at lower costs than other types of treatment protocols.

As discussed above, it is believed that it may actually be undesirable to allow a treatment fluid comprising a relative permeability modifier to be introduced to a water-producing zone when practicing the present methods. Since a relative permeability modifier reduces a zone's permeability to water, exposure of a water-producing zone to a relative permeability modifier may limit one's ability to shut off water production from the water-producing zone using an aqueous treatment fluid comprising a sealant composition (i.e., an aqueous-based sealant). Specifically, if the water-producing zone's permeability to aqueous-based fluids is reduced using a relative permeability modifier, an aqueous-based sealant may not sufficiently penetrate the water-producing zone to deliver the sealant composition to its desired location. Techniques for directing a treatment fluid comprising a relative permeability modifier and a treatment fluid comprising a sealant composition are considered in more detail hereinafter. Specifics regarding how each treatment fluid is delivered to its intended zone may be based on, for example, the location of the hydrocarbon-producing zone relative to the water-producing zone.

In some embodiments, methods described herein may comprise: introducing a first treatment fluid comprising a relative permeability modifier to a hydrocarbon-producing zone of a subterranean formation also comprising a water-producing zone; concurrently with or after introducing the first treatment fluid to the hydrocarbon-producing zone, introducing a second treatment fluid comprising a sealant composition to the water-producing zone; and allowing the relative permeability modifier to substantially prevent the sealant composition from entering the hydrocarbon-producing zone.

When practicing the present methods, the type of wellbore being treated is not believed to be particularly limited. In various embodiments, the wellbore may comprise a vertical wellbore, a horizontal wellbore, a completed wellbore, an uncompleted wellbore, or any combination thereof. In some embodiments, an interval of a wellbore may be treated by the methods described herein.

Likewise, when practicing the present methods, the relative disposition of the hydrocarbon-producing zone to the water-producing zone is not believed to be particularly limited. In some embodiments, the hydrocarbon-producing zone may be located below the water-producing zone. In some or other embodiments, the hydrocarbon-producing zone may be located above the water-producing zone. Similarly, when treating a horizontal wellbore by the present methods, the hydrocarbon-producing zone may be laterally spaced apart from the water-producing zone. As alluded to above and discussed in detail hereinafter, the relative disposition of the hydrocarbon-producing zone to the water-producing zone may, in some cases, dictate the route through which the treatment fluid comprising the relative permeability modifier and the treatment fluid comprising the sealant composition are introduced to the subterranean formation.

Although the methods described herein may be practiced in any type of subterranean formation, in some embodiments, the subterranean formation may lack a natural subterranean barrier between the hydrocarbon-producing zone and the water-producing zone. As used herein, two zones may lack a natural subterranean barrier between them if the zones are sufficiently close to one another that there exists fluid communication between them (e.g., through natural or manmade fractures, porous rock, and/or the like). A natural subterranean barrier may comprise any type of subterranean feature that substantially disrupts fluid communication from occurring between two or more zones. In some embodiments of the present invention, the hydrocarbon-producing zone and the water-producing zone may be in fluid communication with one another. In other embodiments, the hydrocarbon-producing zone and the water-producing zone may not be in direct fluid communication with one another. For example, a hydrocarbon-producing zone and a water-producing zone may not be in direct fluid communication with one another if the zones are spaced sufficiently far apart from one another in the subterranean formation, or if only limited fractures or other fluid conduits exist between them.

In some embodiments, the methods described herein may further comprise forming a fluid seal in the water-producing zone. In some or other embodiments, the methods may further comprise producing a hydrocarbon fluid from the subterranean formation (e.g., from the hydrocarbon-producing zone). Sealant compositions suitable for forming a fluid seal in a water-producing zone are discussed in more detail hereinbelow. In some embodiments, the fluid seal in the water-producing zone may be permanent. As used herein, a fluid seal will be considered permanent if it persists at least during the timeframe over which a hydrocarbon fluid is being produced from the subterranean formation. In other embodiments, the fluid seal may be temporary. In such embodiments, the fluid seal may become at least partially permeable to aqueous fluids at a point in time. The timeframe over which a temporary fluid seal becomes at least partially permeable to aqueous fluids or the mechanism by which it becomes at least partially permeable is not particularly limited. Reasons why one might want to use a temporary fluid seal may include, for example, to perform a subsequent stimulation operation or other treatment in the subterranean formation.

In various embodiments described herein, the treatment fluid comprising the relative permeability modifier may be introduced to a hydrocarbon-producing zone before or concurrently with the introduction of a treatment fluid comprising a sealant composition to a water-producing zone. In some embodiments, the treatment fluid comprising the relative permeability modifier may be introduced to the hydrocarbon-producing zone first. In other embodiments, the treatment fluids may be introduced at the same time (e.g., by dual injection treatments). In some embodiments, at least a portion of the treatment fluid comprising the relative permeability modifier may be introduced to the hydrocarbon-producing zone before the treatment fluid comprising the sealant composition is introduced to the water-producing zone.

In some embodiments, the treatment fluid comprising the relative permeability modifier is not allowed to contact the water-producing zone. In some embodiments, the treatment fluid comprising the sealant composition is not allowed to contact the hydrocarbon-producing zone. In other embodiments, the treatment fluid comprising the sealant composition is not allowed to contact the hydrocarbon-producing zone until the treatment fluid comprising the relative permeability modifier has been introduced thereto. For example, when using an aqueous-based sealant, the aqueous-based sealant may contact the hydrocarbon-producing zone once it has been contacted with a relative permeability modifier, since there is a reduced likelihood of sealant incursion thereto once the initial treatment has occurred.

In some embodiments, methods described herein may comprise: providing a subterranean formation penetrated by a wellbore comprising a work string and an annulus disposed about the work string, the subterranean formation comprising a hydrocarbon-producing zone and a water-producing zone, the water-producing zone being located below the hydrocarbon-producing zone; introducing a first treatment fluid comprising a relative permeability modifier to the hydrocarbon-producing zone, the first treatment fluid being introduced via the annulus; concurrently with or after introducing the first treatment fluid to the hydrocarbon producing zone, introducing a second treatment fluid comprising a sealant composition to the water-producing zone, the second treatment fluid being introduced via the work string; and producing a hydrocarbon fluid from the subterranean formation.

In some embodiments, methods described herein may comprise: providing a subterranean formation penetrated by a wellbore comprising a work string and an annulus disposed about the work string, the subterranean formation comprising a hydrocarbon-producing zone and a water-producing zone, the water-producing zone being located above the hydrocarbon-producing zone; introducing a first treatment fluid comprising a relative permeability modifier to the hydrocarbon-producing zone, the first treatment fluid being introduced via the work string; concurrently with or after introducing the first treatment fluid to the hydrocarbon producing zone, introducing a second treatment fluid comprising a sealant composition to the water-producing zone, the second treatment fluid being introduced via the annulus; and producing a hydrocarbon fluid from the subterranean formation.

In some embodiments, the treatment fluids described herein may comprise an aqueous carrier fluid. Aqueous carrier fluids suitable for use in the treatment fluids described herein may comprise fresh water, saltwater (e.g., water containing one or more salts dissolved therein), brine (e.g., saturated salt water), seawater, produced water (i.e., subterranean formation water brought to the surface), surface water (e.g., lake or river water), flow back water (i.e., water placed into a subterranean formation and then brought back to the surface), or any combination thereof. Generally, the water may be from any source, provided that it does not contain components that might adversely affect the stability and/or performance of the treatment fluid. One of ordinary skill in the art will be able to recognize components whose presence may make a water unsuitable for a particular application.

In general, any type of relative permeability modifier may be used in the embodiments described herein. Suitable relative permeability modifiers may include those described in commonly owned U.S. Pat. Nos. 6,476,169, 7,114,568, and 7,759,292, each of which is incorporated herein by reference in its entirety. In some embodiments, the relative permeability modifier may comprise a hydrophobically modified hydrophilic polymer. In some embodiments, the relative permeability modifier may comprise a hydrophilically modified hydrophilic polymer. Illustrative examples of each type of relative permeability modifier follow hereinafter.

In some embodiments, hydrophobically modified hydrophilic polymers suitable for use in the present methods may include a plurality of hydrophilic monomers, at least a portion of which further comprise a hydrophobic modification thereon. In at least some embodiments, hydrophobically modified hydrophilic polymers may therefore be considered to be a copolymer of hydrophilic monomers and hydrophobically modified hydrophilic monomers. Positioning of the monomers relative to one another in such copolymers may vary without limitation and may be, for example, alternating, random, block, or any combination thereof. Non-limiting examples of suitable hydrophilic monomers that may be present in hydrophobically modified hydrophilic polymers include, for instance, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniummethyl methacrylate halide (halide=chloride, bromide, iodide or a halide equivalent such as, for example, a tosylate or methanesulfonate), methacrylamide, hydroxyethyl acrylate, acrylamide, and the like. Hydrophobic modification of these hydrophilic monomers may comprise an alkyl substitution at a reactive site on the hydrophilic monomer. Non-limiting examples of hydrophobically modified hydrophilic monomers may include, for instance, alkyl acrylates, alkyl methacrylates, alkyl acrylamides, alkyl methacrylamides, alkyldimethylammoniumethyl methacrylate bromide, alkyldimethylammoniumethyl methacrylate chloride, alkyldimethylammoniumethyl methacrylate iodide, alkyldimethylammoniumpropyl methacrylate bromide, alkyldimethylammoniumpropyl methacrylate chloride, alkyldimethylammoniumpropyl methacrylate iodide, alkyl dimethylammoniumethyl methacrylamide bromide, dimethylammoniumethyl methacrylamide chloride, dimethylammoniumethyl methacrylamide iodide, dimethylammoniumpropyl methacrylamide bromide, dimethylammoniumpropyl methacrylamide chloride, dimethylammoniumpropyl methacrylamide iodide, any combination thereof, and the like. In various embodiments, the alkyl group of the hydrophobically modified hydrophilic monomers may comprise about 4 to about 30 carbon atoms.

In some or other embodiments, hydrophobically modified hydrophilic polymers may comprise a copolymer of a hydrophilic polymer and a plurality of hydrophobically modified hydrophilic monomers. Suitable hydrophobically modified hydrophilic monomers may include, but are not limited to, those set forth above. Examples of suitable hydrophilic polymers may include, for instance, poly(vinyl alcohol), polyethyleneimine, polyvinylamine, poly(vinylamine/vinyl alcohol), poly(vinyl pyrrolidone), chitosan, cellulose, cellulose derivatives, acrylate polymers (e.g., poly(dimethylaminoethyl methacrylate), poly(dimethylaminopropyl methacrylamide), poly(acrylamide/dimethylaminoethyl methacrylate), poly(acrylamide/dimethylaminopropyl methacrylamide), poly(acrylic acid/dimethylaminoethyl methacrylate), and the like), polylysine, and the like.

Hydrophobically modified hydrophilic polymers may be prepared by any method. In some embodiments, hydrophobically modified hydrophilic polymers may be prepared by copolymerization of a hydrophilic monomer and a hydrophobically modified hydrophilic monomer. In some embodiments, hydrophobically modified hydrophilic polymers may be prepared by reacting a hydrophilic polymer with a hydrophobic group. In some embodiments, hydrophobically modified hydrophilic polymers may be prepared by reacting a hydrophilic polymer with a hydrophobically modified hydrophilic monomer. In some embodiments, hydrophobically modified hydrophilic polymers may be prepared by reacting a hydrophilic polymer with a hydrophilic monomer and thereafter reacting the hydrophilic monomer with a hydrophobic group. In some embodiments, hydrophobically modified hydrophilic polymers suitable for use in the present methods may have molecular weights ranging between about 100,000 and about 10,000,000, and the molar fraction of the hydrophobically modified hydrophilic monomer(s) may range from about 90% to about 99.9% of the hydrophobically modified hydrophilic polymer.

In some embodiments, hydrophilically modified hydrophilic polymers suitable for use in the present methods may include a plurality of hydrophilic monomers, at least a portion of which further comprise a hydrophilic modification thereon. Suitable hydrophilic monomers may include, but are not limited to, those listed above. In some embodiments, the hydrophilic monomers may be hydrophilically modified through a reaction with a polyether, for example. Suitable polyethers may include, for example, polyethylene oxide, polypropylene oxide, polybutylene oxide, and any combination thereof.

In some or other embodiments, hydrophilically modified hydrophilic polymers may comprise a copolymer of a hydrophilic polymer and a plurality of hydrophilically modified hydrophilic monomers. Suitable hydrophilic polymers may include, but are not limited to, those listed above.

In some embodiments, hydrophilically modified hydrophilic polymers suitable for use in the present methods may have molecular weights ranging between about 100,000 to about 10,000,000, and the mole fraction of the hydrophilically modified hydrophilic monomer(s) may range from about 90% to about 99.9% of the hydrophilically modified hydrophilic polymer.

One of ordinary skill in the art will be able to choose an appropriate concentration of relative permeability modifier to include in a treatment fluid in order to convey a desired degree of protection to a hydrocarbon-producing zone. In some embodiments, the relative permeability modifier may comprise between about 0.01% to about 10% by weight of the treatment fluid. In other embodiments the relative permeability modifier may comprise between about 0.2% to about 2% by weight of the treatment fluid.

In some embodiments, the treatment fluids used herein may comprise a surfactant. When used, the surfactant may comprise between about 0.1% to about 5% by weight of the treatment fluid, in some embodiments, or between about 0.1% and about 2% by weight of the treatment fluid in other embodiments. When use of a surfactant is desired, one of ordinary skill in the art will be able to choose a suitable surfactant for use in a given application.

In some embodiments, sealant compositions suitable for use in the present methods may comprise an aqueous-based sealant. As used herein, an "aqueous-based sealant" refers to a sealant composition that is at least partially miscible with an aqueous carrier fluid. No particular degree of miscibility is to be implied by use of the term "aqueous-based sealant".

Suitable aqueous-based sealants for use in the methods described herein may include, for example, aqueous tackifying agents, gellable compositions, and the like. Gellable compositions may include, for example, gellable silicates, gellable water-soluble polymers, gellable resins, and the like.

Suitable aqueous tackifying agents may include, but are not limited to, poly(acrylic acid), poly(methacrylamide), polyacrylates, polymethacrylates, poly(2-acrylamido-2-methyl propane sulfonic acid), polyacrylamide, polymethacrylamide, any derivative thereof, any copolymer thereof, and any combination thereof. Other suitable aqueous tackifying agents may include, for example, a benzyl coco di-(hydroxyethyl) quaternary amine, p-t-amyl-phenol condensed with formaldehyde, or a copolymer comprising from about 80% to about 100% $C_{1-30}$ alkylmethacrylate monomers and from about 0% to about 20% hydrophilic monomers. Further disclosure regarding aqueous tackifying agents may be found in commonly owned U.S. Pat. Nos. 5,249,627 and 7,131,491, each of which is incorporated herein by reference in its entirety.

In some embodiments, gellable compositions may comprise a gellable silicate. In some embodiments, gellable silicates may be formed by reacting an alkali metal silicate in the presence of a catalyst. Further disclosure regarding gellable silicates may be found in commonly owned U.S. Pat. No. 4,466,831, which is incorporated herein by reference in its entirety.

In some embodiments, gellable compositions may comprise a gellable water-soluble polymer. In some embodiments, the gel formed therefrom may be crosslinked. Further disclosure of crosslinkable water-soluble polymers may be found in commonly owned U.S. Pat. Nos. 5,836,392, 6,192, 986, and 6,196,317, each of which is incorporated herein by reference in its entirety. In some embodiments, suitable gellable water-soluble polymers may comprise acrylamide or methacrylamide polymers, copolymers thereof, or partially hydrolyzed variants thereof. In other embodiments, suitable gellable water-soluble polymers may comprise polysaccharide biopolymers (e.g., guar gum, locust bean gum, tara, konjak, tamarind, starch, cellulose, karaya, xanthan, tragacanth, or carrageenan, and derivatives thereof) or synthetic polymers or copolymers (e.g., poly(maleic anhydride), methylvinyl ether polymers, polyvinyl alcohols, and polyvinylpyrrolidone). Examples of acrylamide- and methacrylamide-containing polymers suitable for use in the present embodiments are described in commonly owned U.S. Pat. No. 6,176,315, which is incorporated herein by reference in its entirety.

In some embodiments, the sealant composition may be degradable in the subterranean formation. As used herein, the term "degradable" refers to a sealant composition that forms a fluid seal that subsequently dissipates at a later time to restore fluid flow. No particular rate or mechanism of degradation is to be implied by the term "degradable." In some embodiments, the sealant composition may be substantially non-degradable. As used herein, the term "substantially non-degradable" refers to a sealant composition that maintains an intact fluid seal at least throughout the time frame during which production of a hydrocarbon fluid takes place from a hydrocarbon-producing zone.

In some embodiments, the methods described herein may further comprise placing a fluid barrier between the hydrocarbon-producing zone and the water-producing zone within a wellbore penetrating the hydrocarbon-producing zone and the water-producing zone (e.g., in the annulus of the wellbore). Suitable fluid barriers will be well known to one having ordinary skill in the art. In some embodiments, the fluid barrier may comprise a chemical barrier such as a gel. In some or other embodiments, the fluid barrier may comprise a fluid isolation device such as, for example, a retainer or a packer (e.g., a retrievable packer, a non-retrievable packer, an inflatable packer, a degradable packer, and the like).

The present methods will now be further described with reference to the drawings. Identical reference characters are used in the drawings to indicate like elements therein. As illustrated in the drawings, the relative disposition of the water-producing zone and the hydrocarbon-producing zone may dictate how treatment fluids are delivered and introduced to each zone. For purposes of clarity in the drawings, fluid flow of a treatment fluid comprising a relative permeability modifier is depicted with solid arrows, and fluid flow of a treatment fluid comprising a sealant composition is depicted with dashed arrows.

Figure 1:
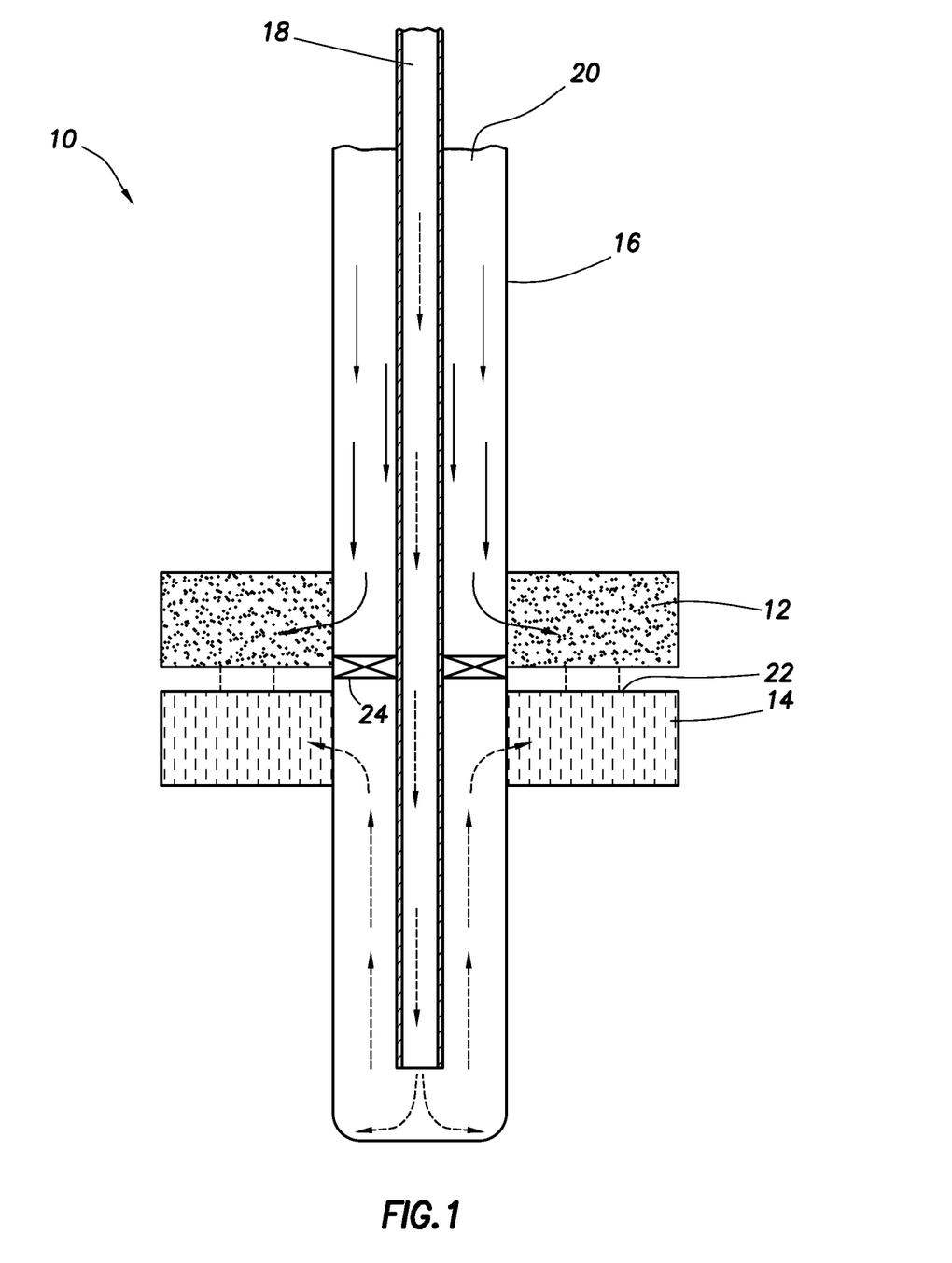
FIGS. 1 and 2 show illustrative schematics of a subterranean formation containing a hydrocarbon-producing zone located above a water-producing zone.
Figure 2:
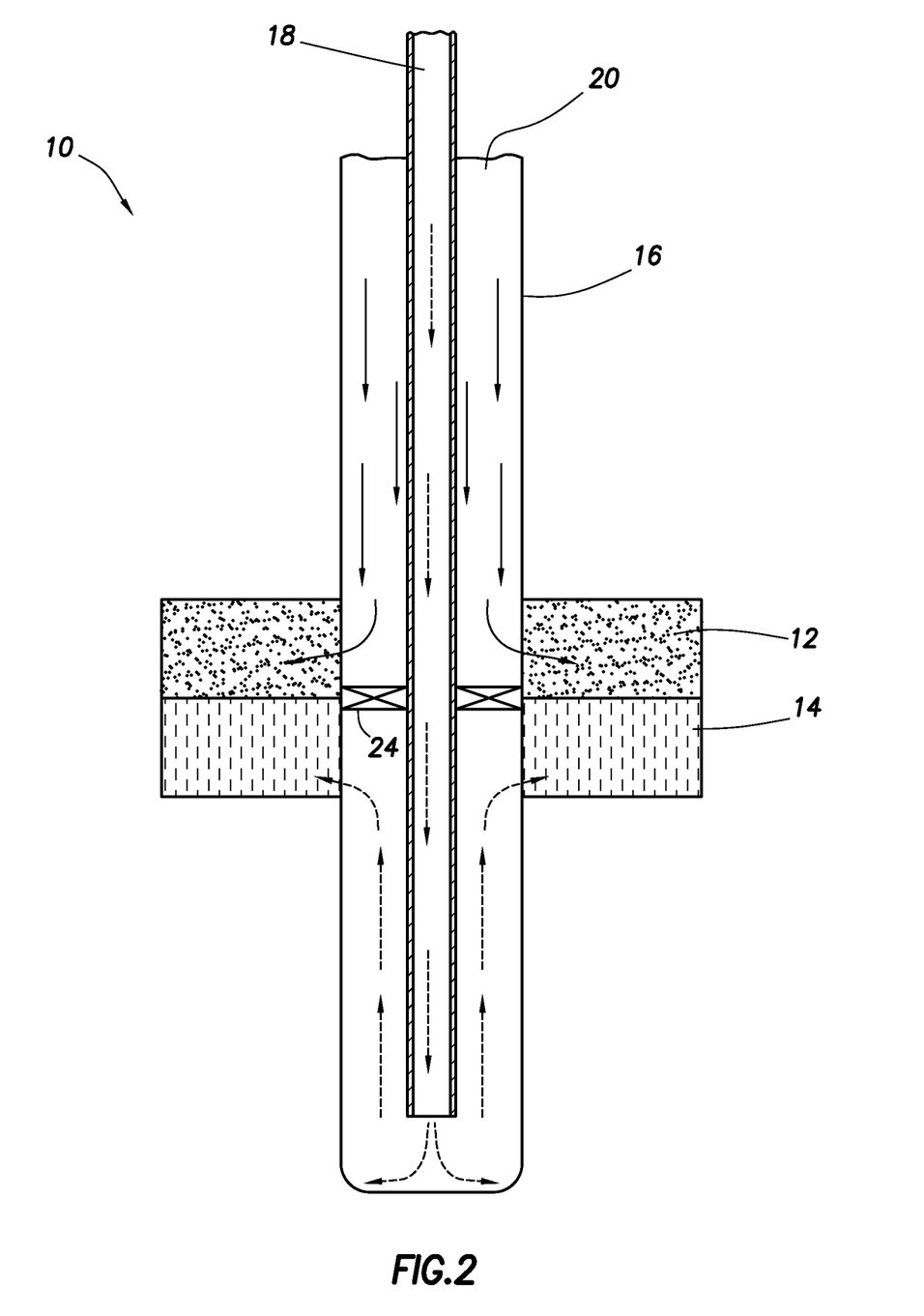

FIGS. 1 and 2 show illustrative schematics of subterranean formation 10 containing hydrocarbon-producing zone 12 located above water-producing zone 14. Subterranean formation 10 is penetrated by wellbore 16, containing work string 18 therein. Work string 18 and the surface of subterranean formation 10 define annulus 20 therein. In FIG. 2, hydrocarbon-producing zone 12 and water-producing zone 14 are adjacent to one another, whereas in FIG. 1, hydrocarbon-producing zone 12 and water-producing zone 14 are in fluid communication with one another via fluid conduits 22 (e.g., fractures and the like). Fluid barrier 24 may be placed in annulus 20 to provide fluid isolation therein.

To treat hydrocarbon-producing zone 12 and water-producing zone 14, a relative permeability modifier may be introduced to hydrocarbon-producing zone 12 via annulus 20. Subsequently or at the same time the relative permeability modifier is being introduced to hydrocarbon-producing zone 12, a sealant composition may be introduced to water-producing zone 14 via the interior of work string 18. As discussed above, the relative permeability modifier may prevent the sealant composition from entering hydrocarbon-producing zone 12 directly, or via fluid conduits 22, when present. Once the treatment has been completed and water-producing zone 14 has been suitably sealed, a hydrocarbon may be produced from hydrocarbon-producing zone via annulus 20.

Figure 3:
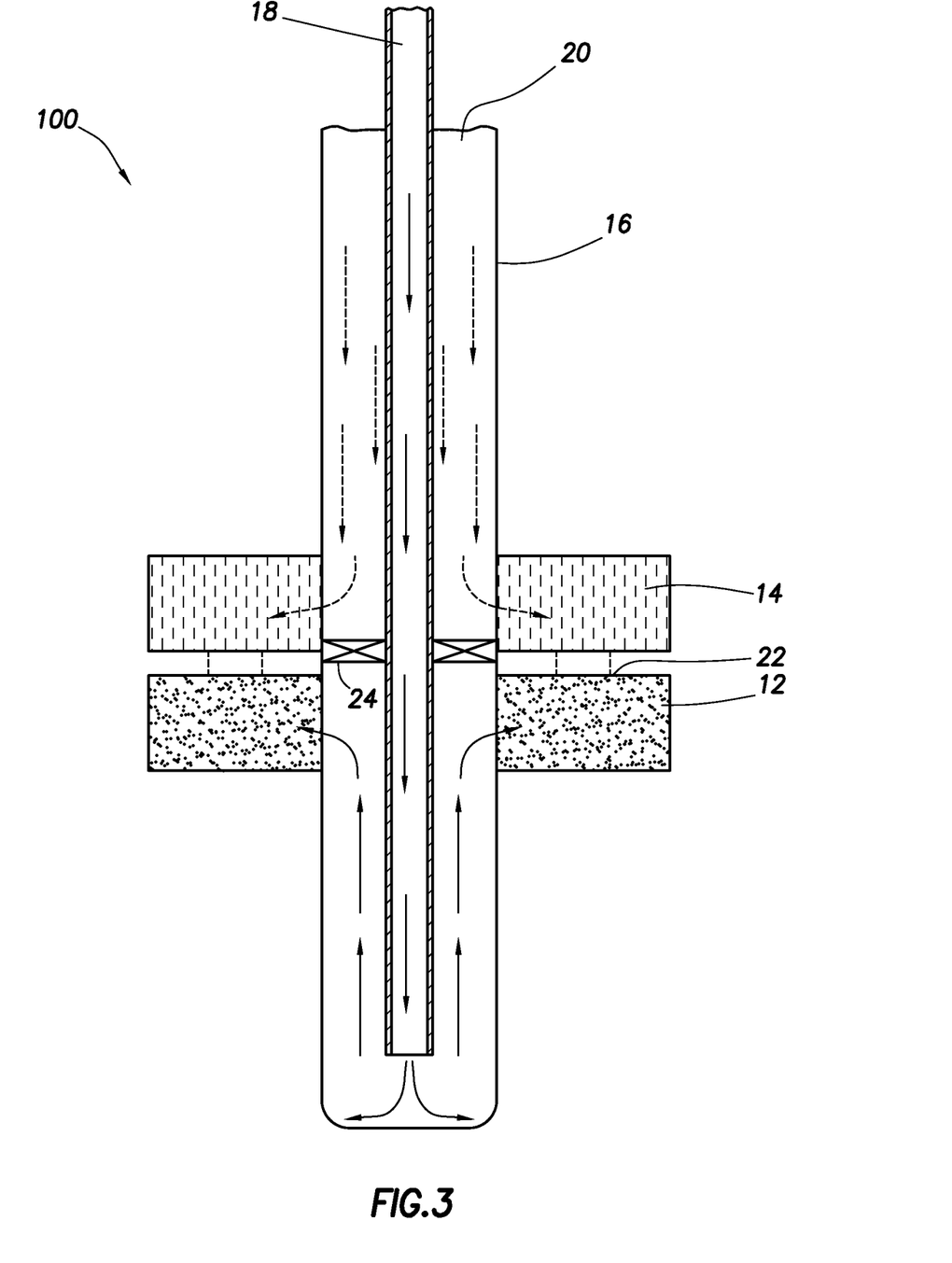
FIGS. 3 and 4 show illustrative schematics of a subterranean formation containing a hydrocarbon-producing zone located below a water-producing zone.
Figure 4:
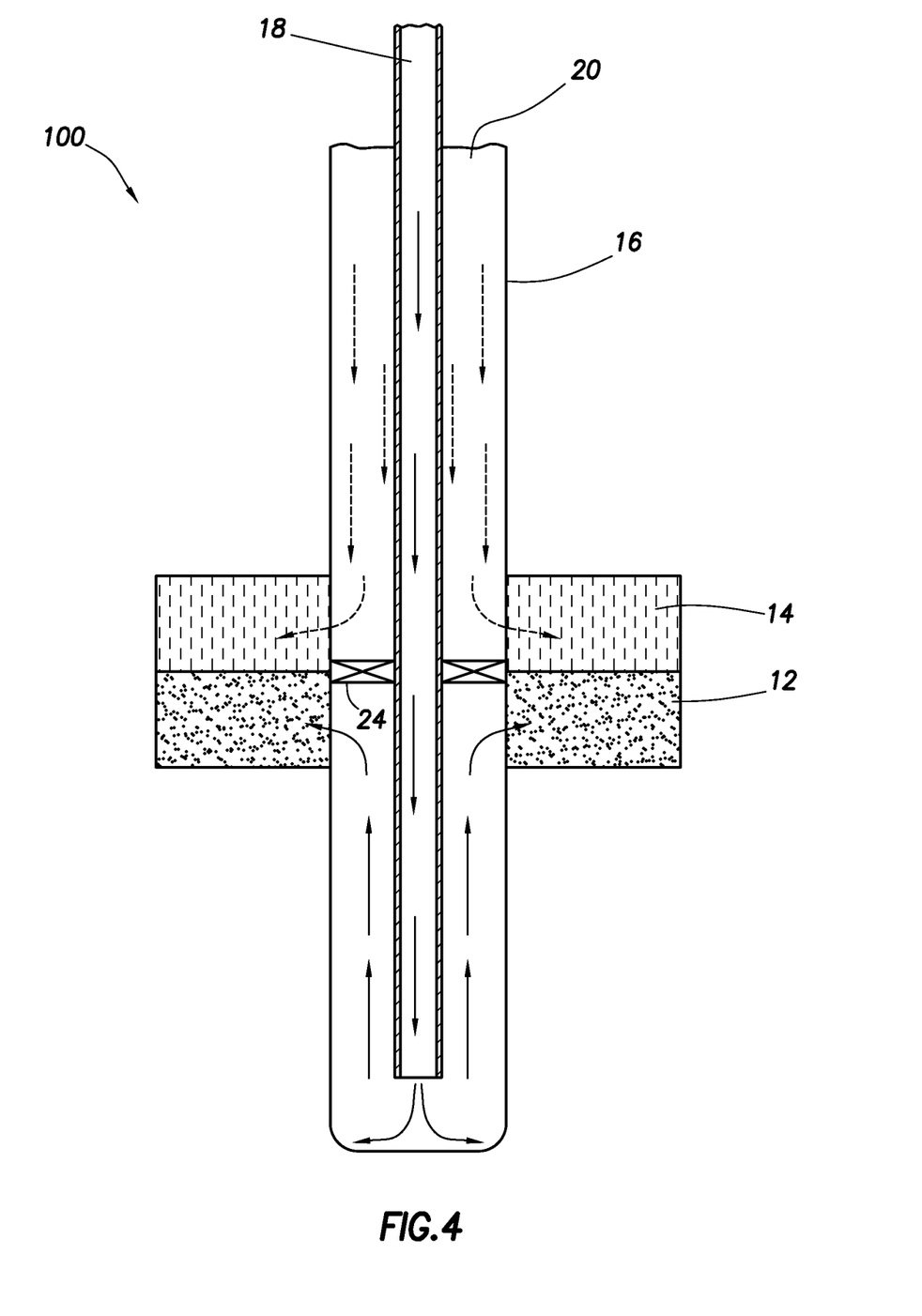

FIGS. 3 and 4 show illustrative schematics of subterranean formation 100 containing hydrocarbon-producing zone 12 located below water-producing zone 14. In FIG. 4, hydrocarbon-producing zone 12 and water-producing zone 14 are adjacent to one another, whereas in FIG. 3, hydrocarbon-producing zone 12 and water-producing zone 14 are in fluid communication with one another via fluid conduits 22.

Operationally, the treatment and production of subterranean formation 100 is similar to that of subterranean formation 10 in FIGS. 1 and 2, with the exception of how the relative permeability modifier and sealant composition are introduced to hydrocarbon-producing zone 12 and water-producing zone 14, respectively. In FIGS. 3 and 4, to treat hydrocarbon-producing zone 12 and water-producing zone 14, a relative permeability modifier may be introduced to hydrocarbon-producing zone 12 via the interior of work string 18. Subsequently or at the same time the relative permeability modifier is being introduced to hydrocarbon-producing zone 12, a sealant composition may be introduced to water-producing zone 14 via annulus 20. Once the treatment has been completed and water-producing zone 14 has been suitably sealed, a hydrocarbon may be produced from hydrocarbon-producing zone 12 via the interior of work string 18. Alternately, fluid barrier 24 may be removed once water-producing zone 14 has been suitably sealed, and the hydrocarbon may be produced via annulus 20.

Depending upon the type of subterranean formation being treated and the intended type of treatment operation being conducted, other components may be optionally included in the treatment fluids described herein. Such components may include, without limitation, salts, pH control additives, surfactants, foaming agents, antifoaming agents, breakers, biocides, crosslinkers, fluid loss control agents, stabilizers, chelating agents, scale inhibitors, gases, mutual solvents, particulates, corrosion inhibitors, oxidizing agents, reducing agents, antioxidants, relative permeability modifiers, viscosifying agents, proppant particulates, gravel particulates, scale inhibitors, emulsifying agents, de-emulsifying agents, iron control agents, clay control agents, flocculants, scavengers, lubricants, friction reducers, viscosifiers, weighting agents, hydrate inhibitors, consolidating agents, any combination thereof, and the like. A person having ordinary skill in the art, with the benefit of this disclosure, will recognize when such optional additives should be included in a treatment fluid, as well as the appropriate amounts to include.

To facilitate a better understanding of the present invention, the following examples of preferred or representative embodiments are given. In no way should the following examples be read to limit, or to define, the scope of the invention.

EXAMPLES

A subterranean formation having a hydrocarbon-producing zone located above a water-producing zone was treated by the techniques described herein. A packer was placed in the annulus of the wellbore between the zones. WATERWEB®, which is a relative permeability modifier that is available from Halliburton Energy Services, was introduced into the subterranean formation via the wellbore annulus. Pumping was continued for 20 minutes, and a slug of fresh water was then added by the annulus, following the WATERWEB® introduction. The slug of fresh water helped displace the WATERWEB® into the formation. Thereafter, H2ZERO®, which is an aqueous-based sealant composition that is available from Halliburton Energy Services, was introduced to the subterranean formation via the coiled tubing for 13 minutes, followed by 11 minutes of pumping 6% aqueous KCl down the annulus. The remaining H2ZERO® was pumped down the coiled tubing for 10 minutes, followed by the introduction of 6% aqueous KCl down the tubing for 8 minutes. After treatment, water production dropped from 97.5% to 93.5%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   introducing a first treatment fluid comprising a relative permeability modifier to a hydrocarbon-producing zone of a subterranean formation also comprising a water-producing zone;
   wherein the relative permeability modifier reduces production of water without substantially reducing production of hydrocarbons from the hydrocarbon-producing zone;
   concurrently with or after introducing the first treatment fluid to the hydrocarbon-producing zone, introducing a second treatment fluid comprising a sealant composition to the water-producing zone; and allowing the relative permeability modifier to substantially prevent the sealant composition from entering the hydrocarbon-producing zone.

2. The method of claim 1, wherein the first treatment fluid is not allowed to contact the water-producing zone.

3. The method of claim 1, wherein the second treatment fluid is not allowed to contact the hydrocarbon-producing zone until the first treatment fluid has been introduced thereto.

4. The method of claim 1, wherein the subterranean formation lacks a natural subterranean barrier between the hydrocarbon-producing zone and the water-producing zone.

5. The method of claim 1, wherein the relative permeability modifier comprises a hydrophobically modified hydrophilic polymer.

6. The method of claim 1, wherein the sealant composition comprises an aqueous-based sealant.

7. The method of claim 1, wherein at least a portion of the first treatment fluid is introduced to the hydrocarbon-producing zone before the second treatment fluid is introduced to the water-producing zone.

8. The method of claim 1, further comprising:
forming a fluid seal in the water-producing zone; and
producing a hydrocarbon fluid from the subterranean formation.

9. The method of claim 1, further comprising:
placing a fluid barrier between the hydrocarbon-producing zone and the water-producing zone within a wellbore penetrating the hydrocarbon-producing zone and the water-producing zone.

10. A method comprising:
providing a subterranean formation penetrated by a wellbore comprising a work string and an annulus disposed about the work string, the subterranean formation comprising a hydrocarbon-producing zone and a water-producing zone, the water-producing zone being located below the hydrocarbon-producing zone;
introducing a first treatment fluid comprising a relative permeability modifier to the hydrocarbon-producing zone, the first treatment fluid being introduced via the annulus;
wherein the relative permeability modifier reduces production of water without substantially reducing production of hydrocarbons from the hydrocarbon-producing zone;
concurrently with or after introducing the first treatment fluid to the hydrocarbon producing zone, introducing a second treatment fluid comprising a sealant composition to the water-producing zone, the second treatment fluid being introduced via the work string; and
producing a hydrocarbon fluid from the subterranean formation.

11. The method of claim 10, wherein the subterranean formation lacks a natural subterranean barrier between the hydrocarbon-producing zone and the water-producing zone.

12. The method of claim 10, wherein the relative permeability modifier comprises a hydrophobically modified hydrophilic polymer.

13. The method of claim 10, wherein the sealant composition comprises an aqueous-based sealant.

14. The method of claim 10, further comprising:
placing a fluid barrier within the annulus between the hydrocarbon-producing zone and the water-producing zone.

15. The method of claim 10, wherein at least a portion of the first treatment fluid is introduced to the hydrocarbon-producing zone before the second treatment fluid is introduced to the water-producing zone.

16. A method comprising:
providing a subterranean formation penetrated by a wellbore comprising a work string and an annulus disposed about the work string, the subterranean formation comprising a hydrocarbon-producing zone and a water-producing zone, the water-producing zone being located above the hydrocarbon-producing zone;
introducing a first treatment fluid comprising a relative permeability modifier to the hydrocarbon-producing zone, the first treatment fluid being introduced via the work string;
concurrently with or after introducing the first treatment fluid to the hydrocarbon producing zone, introducing a second treatment fluid comprising a sealant composition to the water-producing zone, the second treatment fluid being introduced via the annulus; and
producing a hydrocarbon fluid from the subterranean formation.

17. The method of claim 16, wherein the subterranean formation lacks a natural subterranean barrier between the hydrocarbon-producing zone and the water-producing zone.

18. The method of claim 16, wherein the relative permeability modifier comprises a hydrophobically modified hydrophilic polymer.

19. The method of claim 16, wherein the sealant composition comprises an aqueous-based sealant.

20. The method of claim 16, further comprising:
placing a fluid barrier within the annulus between the hydrocarbon-producing zone and the water-producing zone.

21. The method of claim 16, wherein at least a portion of the first treatment fluid is introduced to the hydrocarbon-producing zone before the second treatment fluid is introduced to the water-producing zone.

* * * * *